United States Patent
Schade et al.

(10) Patent No.: US 10,969,337 B2
(45) Date of Patent: Apr. 6, 2021

(54) METHOD AND SYSTEM FOR TAKING MEASUREMENTS IN A HIGH-THROUGHPUT SCREENING WITH HIGH TIME RESOLUTION

(71) Applicant: Bayer Pharma Aktiengesellschaft, Berlin (DE)

(72) Inventors: Andreas Schade, Essen (DE); Mike Küster, Düsseldorf (DE); Klaus Ochmann, Leverkusen (DE); Michael Harnau, Leichlingen (DE); Karl-Hermann Koeching, Dormagen (DE); Nils Burkhardt, Velbert (DE); Bernd Kalthof, Wuppertal (DE); Linn Schneider, Düsseldorf (DE); Georg Schmidt, Wuppertal (DE)

(73) Assignee: BAYER PHARMA AKTIENGESELLSCHAFT, Berlin (DE)

( * ) Notice: Subject to any disclaimer, the term of this patent is extended or adjusted under 35 U.S.C. 154(b) by 0 days.

(21) Appl. No.: 16/470,916

(22) PCT Filed: Dec. 14, 2017

(86) PCT No.: PCT/EP2017/082825
§ 371 (c)(1),
(2) Date: Jun. 18, 2019

(87) PCT Pub. No.: WO2018/114593
PCT Pub. Date: Jun. 28, 2018

(65) Prior Publication Data
US 2020/0191717 A1    Jun. 18, 2020

(30) Foreign Application Priority Data
Dec. 21, 2016  (DE) ..................... 10 2016 225 817.6

(51) Int. Cl.
*G01N 21/64* (2006.01)

(52) U.S. Cl.
CPC ..... *G01N 21/6452* (2013.01); *G01N 21/6408* (2013.01); *G01N 2021/6419* (2013.01)

(58) Field of Classification Search
CPC ....... G01N 21/6452; G01N 2021/6419; G01N 21/6408
See application file for complete search history.

(56) References Cited

U.S. PATENT DOCUMENTS

| | | | |
|---|---|---|---|
| 6,191,852 | B1 | 2/2001 | Paffhausen |
| 7,371,347 | B2 | 5/2008 | Wulf |

(Continued)

FOREIGN PATENT DOCUMENTS

| | | |
|---|---|---|
| DE | 19745373 | 4/1999 |
| DE | 10236029 A1 | 2/2004 |

(Continued)

OTHER PUBLICATIONS

English machine translation of JPH10197449A (Year: 1997).*

(Continued)

*Primary Examiner* — Dominic J Bologna

(57) ABSTRACT

A method and a system for rapid kinetic fluorescence measurement in high-throughput screening with high time-resolution includes providing a microtiter plate having a transparent base and multiple assay wells, a dispensing system arranged above the microtiter plate for simultaneously adding liquid into multiple assay wells, an illumination system beneath the microtiter plate for illuminating the multiple assay wells simultaneously through the transparent base, a detection system for detecting electromagnetic radiation from the multiple assay wells simultaneously through the transparent base, adding 0.3-300 µl of liquid per assay well from the dispensing system into the multiple assay (Continued)

wells, illuminating the multiple assay wells simultaneously through the transparent base using the illumination system before or from the time point of the start of the addition, detecting the electromagnetic radiation from the multiple assay wells simultaneously at a time interval of 1-1000 ms between individual measurement points.

31 Claims, 11 Drawing Sheets

(56) References Cited

U.S. PATENT DOCUMENTS

| | | | |
|---|---|---|---|
| 2005/0218338 | A1 | 10/2005 | Wulf |
| 2014/0005078 | A1* | 1/2014 | Howell ............... G01N 21/253 506/39 |
| 2014/0045186 | A1* | 2/2014 | Gubatayao ....... G01N 35/00693 435/6.12 |

FOREIGN PATENT DOCUMENTS

| | | |
|---|---|---|
| DE | 102004016361 A1 | 11/2005 |
| JP | H10197449 | 7/1998 |
| WO | WO2003100398 A1 | 12/2003 |

OTHER PUBLICATIONS

"FLIPR Membrane Potential Assay Kits," located at https://www.moleculardevices.com/products/assay-kits/ion-channel/flipr-membrane-potential, last visited on Dec. 6, 2018, three pages.

BMG Labtech (2011). "The Flagship for High-Throughput Screening," 6 pages.

BMG Labtech (2011). "The Microplate Reader for Life Science Research," 6 pages.

Dickson, P.N. et al. (1986). "Extension of Accessible First-Order Rate Constants and Accurate Dead-Time Determinations for Stopped-Flow Spectroscopy," Anal. Chem. 58: 3153-3158.

German Search Report dated Mar. 9, 2018 for Application No. 10 2016 015 700.3 filed on Dec. 21, 2016, 8 pages (German Language).

Gonzalez, J.E. et al. (2002). "Cellular Fluorescent Indicators and Voltage/Ion Probe REader (VIPRtm): Tools for Ion Channel and Receptor Drug Discovery," Receptors and Channels 8:283-295.

Hamamatsu (2014). "Functional Drug Screening System," 4 pages.

International Search Report and Written Opinion dated Feb. 22, 2018 for PCT Patent Application No. PCT/EP2017/082825 filed on Dec. 14, 2017, 12 pages.

Mori, T. et al. (2009). "Use of a Real-Time Fluorescence Monitoring System for High-Throughput Screening for Prolyl Isomerase Inhibitors," Journal of Biomolecular Screening 14(4):419-424.

Nakatani, H. et al. (1980). "Analysis of Signal Amplitude in Stopped-Flow Method for Enzyme-Ligand Systems," J. Biochem, 87:1805-1810.

Peterman, B.F. (1979). "Measurement of the Dead Time of a Fluorescence Stopped-Flow Instrument," Analytical Biochemistry 93:442-444.

Ramachandra Shastry, M.C. et al. (1998). "A Continuous-Flow Capillary Mixing Method to Monitor Reactions on the Microsecond Time Scale," Biophysical Journal 74:2714-2721.

Regenfuss, P. et al. (1985). "Mixing Liquids in Microseconds," Rev. Sci. Instrum. 56:283-290.

Roder, H. et al. (2004). "Rapid Mixing Methods for Exploring the Kinetics of Protein Folding," Methods 34:15-27.

Schroeder, K.S. et al. (1996). "FLIPR: A New Instrument for Accurate, High Throughput Optical Screening," Journal of Biomolecular Screening, 1(2):75-80.

Thermo Scientific (2011). "Thermo Scientific Multidrop 384 and Multidrop DW." 2 pages.

Thermo Scientific (2011). "Thermo Scientific Multidrop Combi nL Reagent Dispenser." 4 pages.

Thermo Scientific (2011). "Thermo Scientific Multidrop Combi Reagent Dispenser," 4 pages.

Thermo Scientific (2011). "Thermo Scientific Multidrop Dispensing Cassettes," 2 pages.

Thermo Scientific (2019) "Thermo Scientific Luminoskan Ascent," 2 pages.

Anonymous: "FLUOstar Omega—The Microplate Reader for life science research", Nov. 2016. <<https://www.bmglabtech.com/fileadmin/06_Support/Download_Documents/Brochures/microplate-reader-fluostar-omega-broschure.pdf>> Last accessed Nov. 13, 2020.

\* cited by examiner

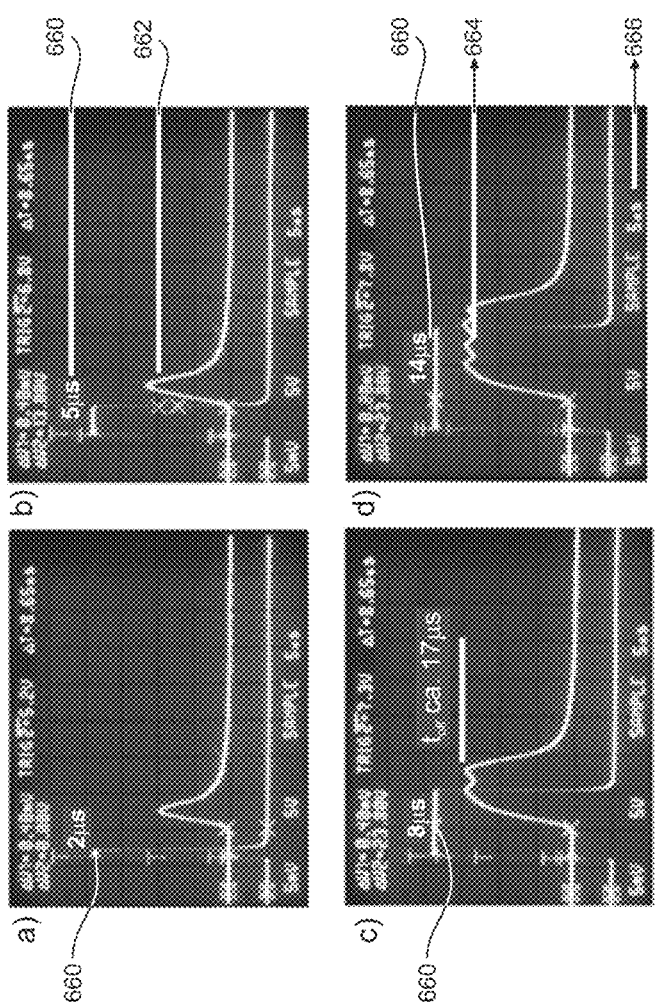

METHOD AND SYSTEM FOR TAKING MEASUREMENTS IN A HIGH-THROUGHPUT SCREENING WITH HIGH TIME RESOLUTION

CROSS-REFERENCE TO RELATED APPLICATIONS

This application is a national stage application under 35 U.S.C. § 371 of International Application No. PCT/EP2017/082825, filed internationally on Dec. 14, 2017, which claims the benefit of German Application No. 10 2016 225 817.6, filed Dec. 21, 2016.

FIELD OF THE INVENTION

The invention relates to a method and system for measurements in high-throughput screening with high time-resolution.

BACKGROUND OF THE INVENTION

The aim of the identification and development of novel drug substances is to identify chemical compounds which modulate biochemical processes, such as ligand binding, macromolecular conformational changes or enzymatic reactions. Use is usually made of high-throughput screening (HTS) for assaying a large number of chemical structures, since the miniaturization ensures a rapid, cost-effective and efficient assay.

Owing to their high sensitivity and automatability, fluorescence-based assays are probably the most important approaches for HTS. In addition to tracking the change in fluorescence due to an enzymatic reaction, use is made of labeling techniques for determining protein-protein interactions or ligand binding by fluorescence resonance energy transfer (FRET), bioluminescence resonance energy transfer (BRET) or fluorescence polarization (FP).

Many biological processes, especially the binding of small ligands, are characterized by very rapid kinetics, which require rapid mixing methods.

However, instruments using plate formats with 384 or 1536 assay wells are often limited with respect to time-resolution, and as a result, the determination of rapid binding kinetics is restricted to methods with low throughput. Even the screening approach of instruments equipped with a multidispenser (see Gonzalez, J. E., and Maher, M. P. (2002) Cellular Fluorescent Indicators and Voltage/Ion Probe Reader (VIPR TM): Tools for Ion Channel and Receptor Drug Discovery, *Receptors and Channels* 8, 283-295; Mori, T., Itami, S., Yanagi, T., Tatara, Y., Takamiya, M., and Uchida, T. (2009) Use of a Real-Time Fluorescence Monitoring System for High-Throughput Screening for Prolyl Isomerase Inhibitors, *Journal of Biomolecular Screening* 14, 419-424; Schroeder, K. S., and Neagle, B. D. (1996) FLIPR: A New Instrument for Accurate, High Throughput Optical Screening, *Journal of Biomolecular Screening* 1, 75-80.), this considerably improving time-resolution, is mainly restricted to the seconds time range.

Rapid mixing methods known from the prior art are continuous-flow or stopped-flow devices.

In the case of continuous-flow experiments, the reaction is analyzed under equilibrium flow conditions as a function of the path downstream of the mixer. Improvements in mixer design led to dead times within the range of 100 µs or even shorter (Regenfuss, P., Clegg, R. M., Fulwyler, M. J., Barrantes, F. J., and Jovin, T. M. (1985) Mixing liquids in microseconds, *Rev. Sci. Instrum.* 56, 293-290; Shastry, M. C. R., Luck, S. D., and Roder, H. (1998) A Continuous-Flow Capillary Mixing Method to Monitor Reactions on the Microsecond Time Scale, *Biophysical Journal* 74, 2714-2721; Roder, H., Maki, K., Cheng, H., and Ramachandra Shastry, M. C. (2004) Rapid mixing methods for exploring the kinetics of protein folding, *Methods* 34, 15-27.). However, high flow rates and relatively large channel dimensions are necessary to achieve efficient mixing, and this uses up large amounts of material.

In the case of commercially available stopped-flow instruments, the reactants are supplied via two syringes with the aid of a pneumatic actuator. After the observation cell has been filled, the flow is abruptly stopped when the stop syringe hits a stop block. Instruments can routinely achieve dead times of a few milliseconds (Dickson, P. N., and Margerum, D. W. (1986) Extension of accessible first-order rate constants and accurate dead-time determinations for stopped-flow spectroscopy, *Analytical Chemistry* 58, 3153-3158; Nakatani, H., and Hiromi, K. (1980) Analysis of Signal Amplitude in Stopped-Flow Method for Enzyme-Ligand Systems, *Journal of Biochemistry* 87, 1805-1810; Peterman, B. F. (1979) Measurement of the dead time of a fluorescence stopped-flow instrument, *Analytical Biochemistry* 93, 442-444).

Both continuous-flow and stopped-flow instruments are methods with low throughput that is restricted to one cuvette or one channel A rapid mixing method for assaying multiple inhibitors and concentrations is, however, necessary, since the determination of rapid binding reactions or enzyme kinetics plays a fundamental role in the identification and development of novel drug substances. To be able to observe rapid kinetics in microtiter plates, a new method was developed, based on an imaging instrument for the detection of rapid kinetics that combines high time-resolution with the throughput of a highly parallelized system. This allows, for the first time, the efficient application of rapid kinetics to the identification and development of novel drug substances.

DE 10 2004 016 361 A1 and WO 03/100398 A1 disclose an optical analyzer for fluorescence measurements on microtiter plates. The microtiter plates have a transparent base. The excitation beam path and the evaluation beam path are directed to the transparent base of the microtiter plate. Situated above the microtiter plates is a dispenser or pipettor for addition of liquid during measurements of the emission of the samples of the microtiter plate, which measurements are running continuously and simultaneously.

The basic idea of the invention from DE 10 2004 016 361 A1 and WO 03/100398 A1 is based on the consideration that, in the case of a high sample throughput with a multiplicity of individual samples on microtiter plates, the excitation of the individual samples and the recording of the emission and optionally the addition of liquids should take place simultaneously and the emission (fluorescence or luminescence) of all the samples of the microplate can be constantly detected over a relatively long time, ideally by means of an image recorder (e.g., intensified camera).

For cell biology assays, in which there is frequently the need to measure the kinetics of a fluorescence reaction after addition of a pharmacologically effective substance, the analyzer, owing to the simultaneous measurement of all wells, meets the requirement that the emission of the samples is to be measured before, during and after substance addition. If fluorescence excitation and detection of the emission of the microtiter plate take place from below, it is possible, from above, for substances and/or other liquids to be contactlessly added in any manner, even simultaneously, in multiple wells or different substances and/or other liquids to be contactlessly added at defined times and in different amounts or concentrations and for them to be continuously observed. Especially for the HTS regime, it is possible through this parallel measurement by means of a CCD camera to gain the so-called multiplex advantage and to thus achieve a high sample throughput despite distinctly increased measurement time per well.

Although a high sample throughput can be achieved using the optical analyzer from DE 10 2004 016 361 A1 and WO 03/100398 A1, it is not designed for intensity measurements with a time-resolution of under 1 sec, as are necessary for the clarification of rapid kinetics in certain biological processes, such as the binding of small ligands.

SUMMARY OF THE INVENTION

According to some embodiments, a method for rapid kinetic measurements in high-throughput screening with high time-resolution comprises:
 a. providing
  i. a microtiter plate having a transparent base with a multiplicity of assay wells,
  ii. a dispensing system having a dispensing device arranged above the microtiter plate for the simultaneous addition of liquid into multiple assay wells;
  iii. an illumination system beneath the microtiter plate that is suitable for illuminating the multiple assay wells simultaneously through the transparent base; and
  iv. a detection system that is suitable for detecting electromagnetic radiation from multiple or all assay wells simultaneously through the transparent base.
 b. adding 0.3-300 μl of liquid per assay well from the dispensing device into the multiple assay wells simultaneously within 5-200 ms at a pressure within the range from 0.5 bar to 2 bar;
 c. illuminating multiple assay wells simultaneously through the transparent base using the illumination system with the start of illumination before or from the time point of the start of the addition;
 d. detecting the electromagnetic radiation from the multiple or all the assay wells simultaneously at a time interval of 1-1000 ms between the individual measurement points.

According to some embodiments of the invention, a system is provided for rapid kinetic measurements in high-throughput screening with high time-resolution, comprising
 a microtiter plate having a transparent base with a multiplicity of assay wells,
 a dispensing system having a dispensing device arranged above the microtiter plate for the simultaneous addition of liquid into multiple assay wells;
 an illumination system beneath the microtiter plate that is suitable for illuminating the multiple assay wells simultaneously through the transparent base; and
 a detection system that is suitable for detecting electromagnetic radiation from the multiple or all the assay wells simultaneously through the transparent base.

The microtiter plate preferably has 384 or 1536 assay wells.

Dispensing Device

According to some embodiments, the dispensing device comprises a housing having at least one pressure chamber, having a supply opening for the supply of liquid into the pressure chamber and having a multiplicity of conduits between the pressure chamber and an external side of the housing, there being situated in each of the conduits a tube, the first end of which protrudes into the pressure chamber and the second end of which protrudes out of the housing on the external side.

The pressure chamber preferably has a larger extent in one spatial dimension than in the other two spatial dimensions. The longitudinal axis of the pressure chamber runs in the direction of the larger extent. The longitudinal axis of the pressure chamber simultaneously runs in parallel to the external side of the housing. In a preferred embodiment, the pressure chamber is cylindrical or cuboid.

The conduits can be situated in one of the walls of the pressure chamber, which run in parallel to the longitudinal axis of the pressure chamber. Preferably, the conduits are arranged in parallel to one another. At least two conduits are present. The conduits can be arranged in one or more rows in parallel to the longitudinal axis of the pressure chamber. In this connection, there are preferably 12, particularly preferably 24 or 48, conduits per row. Ideally, the number of conduits per row is matched with the number of wells in a row of the microtiter plate (long side) into which dispensing is carried out by the dispensing device.

The tubes are preferably capillaries made of metal or plastic, capillaries, i.e. thin tubes, in which the capillarity effect occurs with the liquids used. They should have an inner diameter within the range from 0.1 mm to 0.8 mm, preferably 0.2 mm to 0.6 mm. The outer diameter can be within the range from 0.35 mm to 2 mm, preferably 0.6 mm to 1.1 mm. The length of the tubes is within the range from 6 mm to 15 mm, preferably 8.5 mm to 13 mm, particularly preferably 10 mm to 13 mm.

The tubes can be arranged such that they are perpendicular (90°) to the external side of the housing or are inclined at an angle to the external side of the housing within the range from 40° to <90°, depending on whether liquid is to be delivered into the well of the microtiter plate in a perpendicular manner from above, or is to be delivered or injected onto the side wall of the well at an angle.

To increase the hydrophobicity of the tubes which can be situated on the external side of the housing, they can be sheathed, preferably with plastic, for example Teflon.

The capillary tubes can protrude into the pressure chamber with one end and protrude out of the housing with the other end.

In one embodiment, the supply opening for the liquid is situated in one of the walls arranged perpendicularly to the longitudinal axis of the dispensing chamber. The housing can furthermore comprise a vent opening, out of which air is forced during filling of the dispensing chamber with liquid. Said vent opening can be situated in one of the walls arranged perpendicularly to the longitudinal axis of the dispensing chamber.

The pressure chamber can have a cross-sectional area within the range from 60 mm² to 300 mm² or a diameter within the range from 4 mm to 10 mm, preferably within the range from 5.5 mm to 6.5 mm.

The housing of the dispensing device can also comprise more than one pressure chamber, for example two, three or four pressure chambers, the longitudinal axes of which run in parallel to one another. Belonging to each pressure chamber is a separate supply opening for the supply of liquid into the pressure chamber, and each pressure chamber has a multiplicity of conduits between the pressure chamber and the external side of the housing with the corresponding conduits and tubes. Preferably, the conduits and tubes of the various pressure chambers are arranged in parallel to one another. If necessary, it is also possible for multiple housings having one or more pressure chambers to be arranged next to one another and in parallel to one another.

Because of the large volume of the pressure chamber combined with the short tubes protruding into the pressure chamber, there is no pressure gradient and a very rapid and quantitatively accurate delivery of the liquid is thus possible. A parallel, precise and rapid dispensing in the µl range into, for example, 384-well or 1536-well microtiter plates is made possible.

According to some embodiments, the dispensing system additionally comprises, for the dispensing device, a liquid reservoir which is connected to the supply opening of the dispensing device via a line. Pressure on the liquid reservoir brings about the pumping of liquid from the liquid reservoir into the pressure chamber. To this end, the liquid reservoir is closed off from the surrounding atmosphere in a pressure-tight manner and connected to a pump which builds up the necessary pressure. In the case of multiple pressure chambers, the supply opening of each pressure chamber can be connected to the same reservoir of liquid or various reservoirs of liquid.

Via the switching time of the valve between liquid reservoir and supply opening in combination with the pressure of the pump, it is possible to control the amount of liquid which gets into the pressure chamber in each switching cycle (conduit open/closed) and is outputted via the individual tubes.

In one embodiment of the invention, the liquid from the liquid reservoir rests against the valve under a pressure within the range from 0.5 to 2 bar, preferably within the range from 0.5 to 0.85 bar, and the valve has a switching time within the range from 5 ms to 200 ms (5-60 ms in the case of microtiter plates with 1536 wells, 40-200 ms in the case of microtiter plates with 384 wells), preferably within the range from 5 ms to 50 ms.

The switching time of the valve and the pressure due to the pump can be adjusted such that the delivery volume of the dispensing device is within the range 0.3 and 300 µl per capillary, preferably between 1 and 30 µl.

Illumination

According to some embodiments, the illumination system comprises at least one pair of LED light modules, which are arranged beneath the microtiter plate on opposite sides and illuminate the transparent base of the microtiter plate at an angle of 20 to 80 degrees.

An LED light module according to an embodiment of the invention is distinguished by the maximum emission being reached in less than 10 µsec after the start of a trigger signal and the pulse having subsided within ≤20 µsec after the end of the trigger signal. Rapid kinetic measurements are possible as a result. At the same time, the optical arrangement allows a homogeneous illumination of the microtiter plate.

The LED light module can contain LED light sources arranged in one or more rows and optionally a rod-shaped, plano-convex cylindrical lens, the planar side of which is arranged on the LED light sources such that the radiation of the LED light sources enters the cylindrical lens on the planar side and exits the cylindrical lens on the convex side.

The number of LED light sources can be within the range from 12 to 36.

Preferably, the LED light sources are arranged on an LED board, and the LED board is connected in a heat-conducting manner to a heat sink.

An extinction filter can be situated between the LED light sources and the cylindrical lens, and a protective glass or a polarization filter can be situated between extinction filter and cylindrical lens.

In a preferred embodiment, the LED light sources are high-output LED light sources within the visible (VIS) or UV wavelength range, preferably within the wavelength range from 340 nm to 800 nm.

For certain applications, it is also possible to use more than one pair of LED light modules or it is possible to use multiple LED light modules. If the various LED light modules have different wavelengths, it is possible to effect a fluorescence excitation in multiple wavelengths at the same time.

According to an embodiment, two pairs of LED light modules can each be arranged beneath the microtiter plate on opposite sides and can illuminate the transparent base of the microtiter plate at the same angle or a different angle. Two or more pairs of LED light modules can each be arranged on the same sides of the microtiter plate at differing distance from the microtiter plate and can each illuminate the transparent base of the microtiter plate at differing illumination angle.

Preferably, the two LED light modules of a single pair are arranged beneath the microtiter plate on opposite sides and, additionally, one or two further LED light modules are arranged more centrally beneath the microtiter plate, with the result that the emitted light of these additional LED light modules hit the transparent base of the microtiter plate at a greater angle to the plane of the microtiter plate than the light of the LED light modules of the pair.

According to an embodiment, one application of LED light modules having different wavelengths is the field of optogenetics. Optogenetics means that genetically modified cells are controlled by light with the aid of light-sensitive proteins. To this end, one wavelength is used to activate said proteins and to influence cellular processes therebeyond. To observe said processes, use is made of a further wavelength for the excitation of fluorescence emission for the fluorescence measurement of a corresponding sensor or dye.

Detection

The detection of the emitted light can be done at a right angle to the base of the microtiter plate.

The detection system can be positioned centrally under the microtiter plate and receive the emitted light directly, and/or the emitted light is directed onto the detection system via an appropriate deflection mirror or dichroic beam splitter.

The detection of the emitted light can be done simultaneously at various wavelengths.

The detection system is suitable for the detection of the electromagnetic radiation from multiple or all assay wells simultaneously at a time interval of 1-1000 ms between the individual measurement points.

BRIEF DESCRIPTION OF THE DRAWINGS

The invention will now be explained in reference to the enclosed drawings, which show advantageous example embodiments:

FIG. 10 shows the LED emission at trigger signals of differing length;

DETAILED DESCRIPTION OF THE INVENTION

Figure 1:
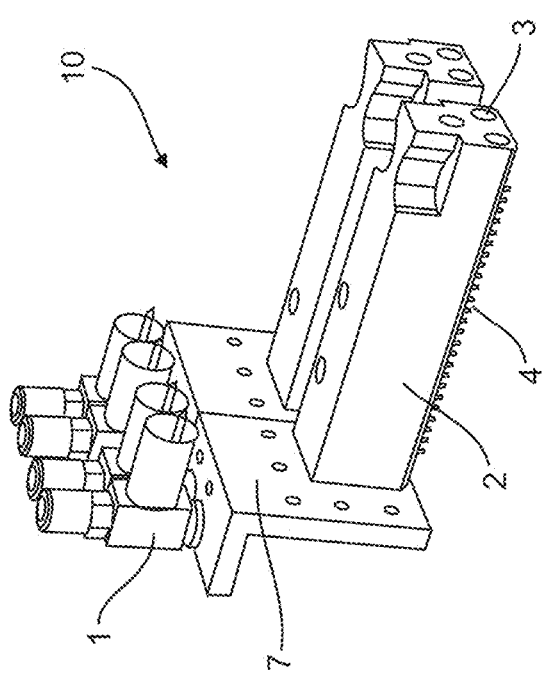
FIG. 1 is a perspective view of two dispensing devices with two dispensing chambers.
Figure 2:
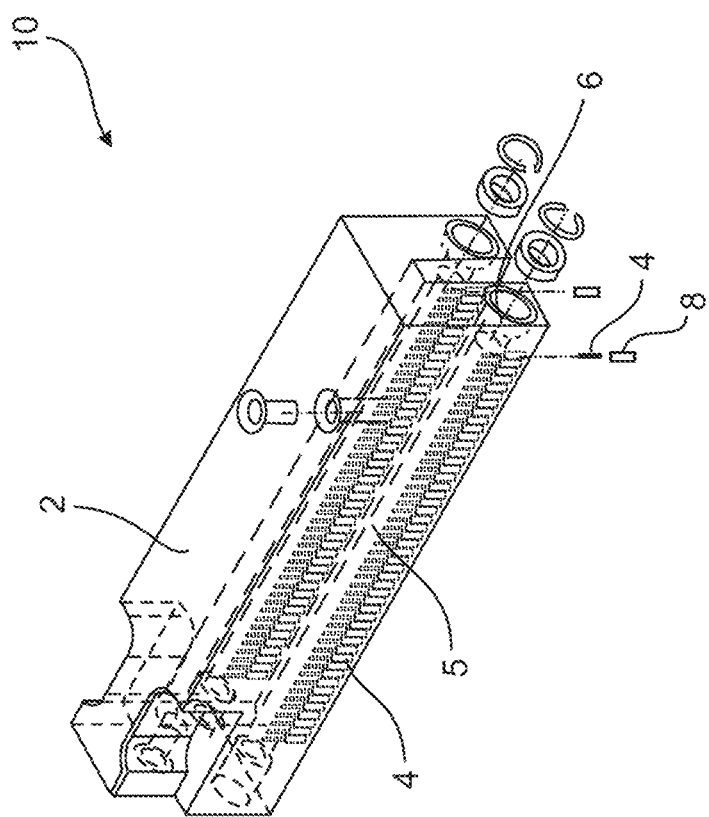
FIG. 2 is a perspective view of the inner structure of the dispensing device with two dispensing chambers.
Figure 3:
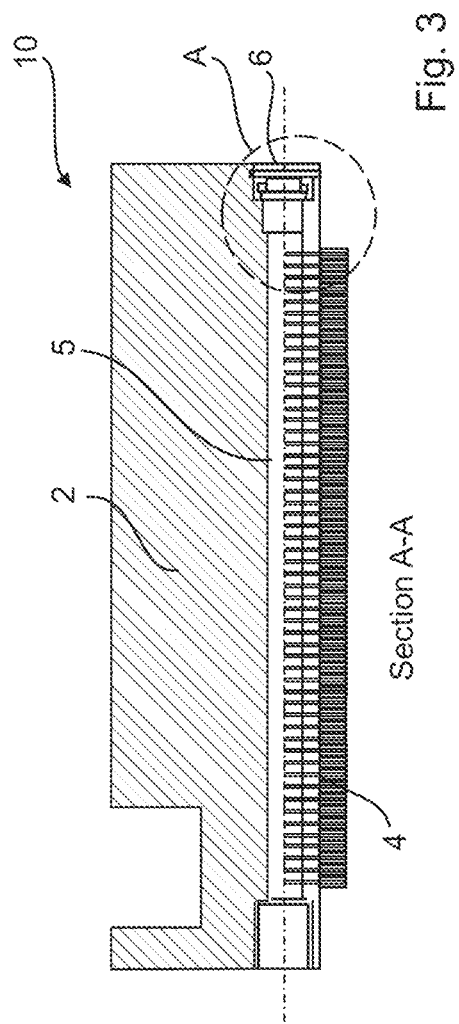
FIG. 3 is a side view of the dispensing device.
Figure 4:
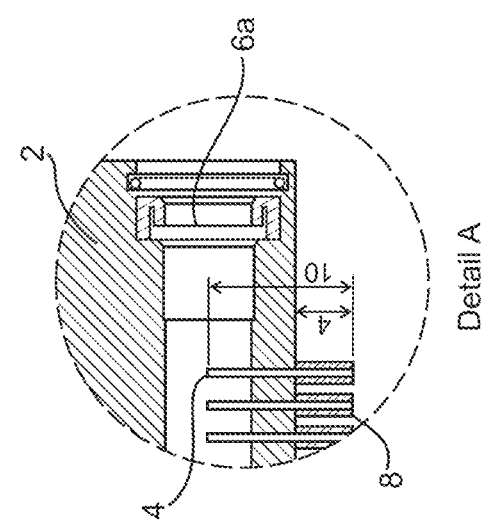
FIG. 4 is a side view (valve-side) of an enlarged section of the dispensing device.

FIG. 1 shows two parallelly arranged dispensing devices 10 according to the invention, each with two pressure chambers, in perspective view. Further views of a dispensing device are shown in FIGS. 2 to 4. Each dispensing device 10 has a cuboid housing 2 with two tubular bores of 4-10 mm diameter and 120-140 mm length. Said bores form two parallel pressure chambers 5. Each bore has an open end which forms the circular supply opening 6. The opposite end is opened for system filling and emptying and is sealed tight during dispensing operation. Situated here is the leakage or vent opening 3. The side of the housings 2 on which the supply opening 6 is situated is attached to a mount 7 such that said housings protrude away from the mount 7 in a horizontal manner. The mount 7 has a recess for each supply opening 6. Situated on the underside of the outwardly protruding housing 2 is a row of up to 48 conduits between each pressure chamber 5 and the underside of the housing 2, there being situated in each of the conduits a capillary tube 4 made of preferably stainless steel, the first end of which protrudes into the pressure chamber 5 and the second end of which protrudes out of the housing 2 on the underside. The capillary tubes have an inner diameter of 0.1-0.8 mm and are arranged perpendicularly. The segments of the tubes protruding out of the underside of the housing 2 are hydrophobically sheathed (preferably with Teflon).

FIG. 3 shows the dispensing device 10 in side view. The circular section A is shown enlarged in FIG. 4. In FIG. 4, it can be seen that the capillary tubes 4 protrude into the pressure chamber up to half the height thereof. This has been found to be particularly advantageous for a uniform dispensing.

Figure 5:
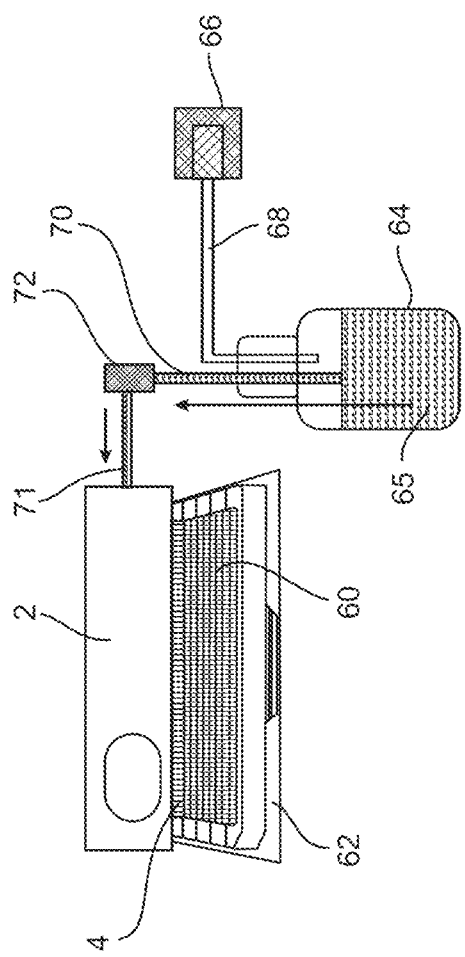
FIG. 5 shows the dispensing system with liquid reservoir.

FIG. 5 shows the dispensing system according to an embodiment of the invention. The pressure chamber 5 (not visible in the housing 2) of the dispensing device 10 is connected, via a line 71, a valve 72 and a further line 70, to a liquid situated in a reservoir vessel. Via a membrane pump 66 and a pressure line 68, room air is introduced into the reservoir vessel under a pressure of 0.8 bar. It is also possible to use a different gas such as $N_2$ instead of room air. It is also possible to use a different pressure supply system instead of a membrane pump. Solenoid valves with low dead-space volume and short switching time, as sold by Parker Hannifin Corp., Cleveland, Ohio 44124 USA, for example, have been found to be suitable valves.

Figure 6:
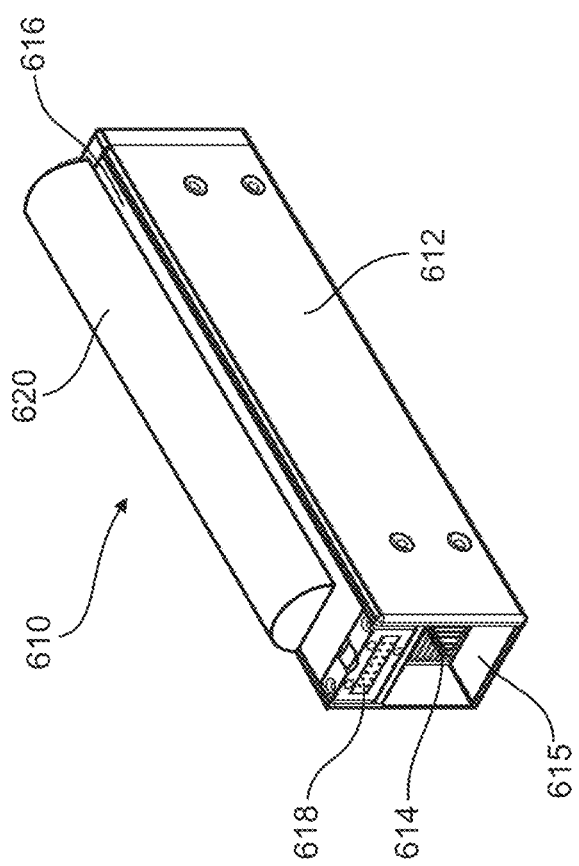
FIG. 6 is a perspective view of the LED light module.

FIGS. 6 to 9 show various views of an LED light module 610. FIG. 6 shows the LED light module 610 in perspective view. The LED light module 610 has a housing 612 with a base 615 and two side walls and a front housing cover 613 with cooling-air inflow opening. The open side of the housing 612 that is opposite the base 615 is closed off by a protective-glass mount 617 and a protective glass 616. In the case of polarization measurements, the protective glass 616 can be replaced with a polarization filter. Above the protective glass 616 and the protective-glass mount 617, it is possible to mount a rod-shaped, plano-convex cylindrical lens with the planar side in the direction of the protective glass 616 or protective-glass mount 617. Situated opposite the front housing cover 613, in the open, elongated side of the housing, is the fan position for suction of cooling air. Situated above the fan position 614 are electrical connections 618.

According to some embodiments, situated inside the housing 612 is a heat sink 632, on which, firstly, the electrical connections 618 and, secondly, the LED board 630 are mounted. The LED board 630 can consist of one or two parallel rows with 12 to 36 LEDs 631, preferably a row with 24 LEDS 631. The LEDs 631 are arranged such that they would, during operation, radiate upward in the image. Situated above the LEDs 631 is the excitation filter 622 in the filter mount 623. The housing is closed off by protective glass 616 and the protective-glass mount 617. Situated on the housing base 615 is a holding magnet 636 and an RFID transponder 634. This could also be mounted in a side wall.

For the measurements of the embodiments described below, use was made of an LED light module 610 with the LEDs 631 of the LuxeonRebel type from Philips. Other LEDs 631 suitable for the same use are for example:

Osram: Golden DRAGON Plus, OSLON SSL 80/150, Platinum Dragon

CREE: XLampXPC, XLampXRC, Xlamp7090XRE, XLampXPE,

Nichia: NCU133A, NCSU034B, NCSU033B

The emission output of said LEDs is 100-2000 mW, dependent on wavelength.

FIG. 10a) to d) show measurements of the temporal course of the LED emission at trigger signals 660 of differing length. A trigger signal 660 of differing length is given in each case via the connections 618 to the LEDs 631 of the board 630. Depending on the length of the trigger signal 660, an LED emission of differing intensity and length is achieved. The x-axis 666 shows the time in units of 5 μsec.

FIG. 10a) shows the LED emission at a trigger signal 660 of 2 μsec in length. The LED emission only starts after a dead time of 5 μsec after the start of the trigger signal 660 and reaches 60% of the maximum emission output.

FIG. 10b) shows the LED emission at a trigger signal 660 of 5 μsec in length. The LED emission 662 only starts after a dead time of 5 μsec after the start of the trigger signal 660 and reaches 70% of the maximum emission output.

FIG. 10c) shows the LED emission at a trigger signal 660 of 8 μsec in length. The LED emission only starts after a dead time of 5 μsec after the start of the trigger signal 660 and reaches 100% of the maximum emission output.

FIG. 10d) shows the LED emission 64 at a trigger signal 660 of 14 μsec in length. The LED emission only starts after a dead time of 5 μsec after the start of the trigger signal 660 and reaches 100% of the maximum emission output.

The time delay between the start of the trigger signal 660 and the maximum emission output of the LEDs 631 of the module is about 8 μsec. 17 μsec after the end of the trigger signal 660, the LED emission has completely subsided. The LED intensity can be controlled via a pulse-width modulation or current control.

Figure 12:
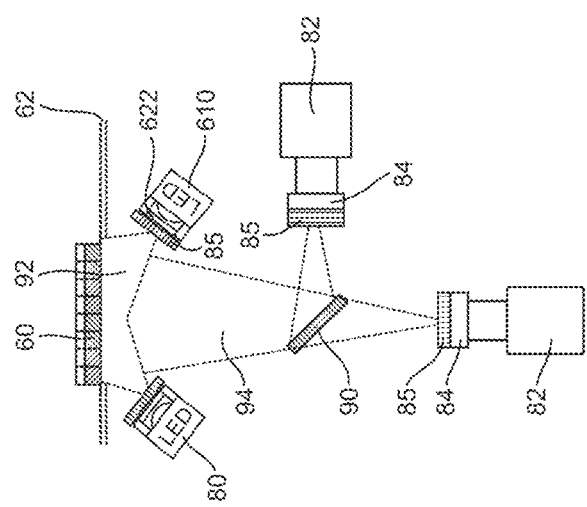
FIG. 12 shows the imaging measurement instrument (two-channel detection)
Figure 11:
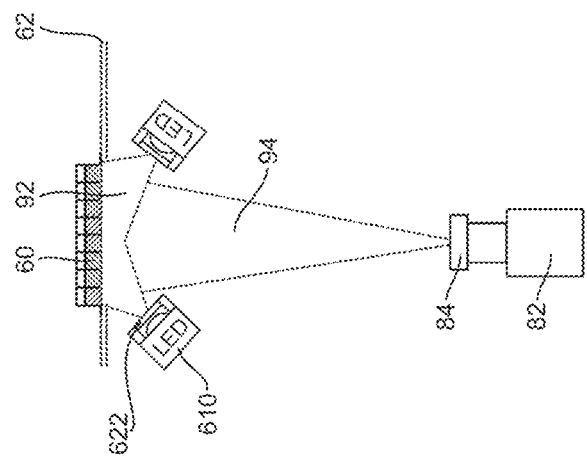
FIG. 11 shows the imaging measurement instrument (one-channel detection)

According to some embodiments, FIGS. 11 and 12 will be used to describe the operation of a system for rapid kinetic measurements in high-throughput screening with high time-resolution.

The dispensing of the liquid containing the reactants is done from the upper side of the microtiter plate 60 with transparent base that is situated on a microtiter-plate positioning tray 62. Dispensing is combined with illumination from diagonally below and with detection using appropriate cameras from below. The progress of a reaction is tracked by the simultaneous recording of the fluorescence profile of a row with 48 assay wells of the microtiter plate 60. The dispensing and illumination system are, in this connection, designed and controlled such that it is possible with this arrangement to observe the kinetic process inclusive of dispensing time and mixing time.

According to some embodiments, the dispensing is done with the aid of a dispensing system. The dispensing device 10 is part of said dispensing system. The liquid 65 in a reservoir vessel 64 containing the reactant to be analyzed is pumped into the dispensing chamber 5 (not shown) of the dispensing device via a valve 72 (FIG. 5). The capillary tubes 4 have an opening (=inner diameter) of ~800 μm, this allowing a parallel dispensing into 48 assay wells of the microtiter plate (FIG. 5). To achieve mixing conditions of high turbulence, the orientation of the dispensing outlets of the tubes 4 is specifically adapted to microtiter plates with 384 and 1536 assay wells. According to an embodiment, the best mixing results for microtiter plates with 384 assay wells were achieved by dispensing the reactant in a diagonal manner onto the microtiter plate wall. In contrast, the lower dispensing volume necessary for microtiter plates 60 with 1536 assay wells is dispensed perpendicularly, as shown in FIG. 5. The switching time of the valve, and thus the volume to be dispensed, is defined via a calibration function (linear or 3rd order polynomial) stored for any pressure to be used. A precise microtiter plate mount 62 ensured the optimum and reproducible orientation of the dispensing device 10 in relation to the wells of the microtiter plate 60.

Figure 7:
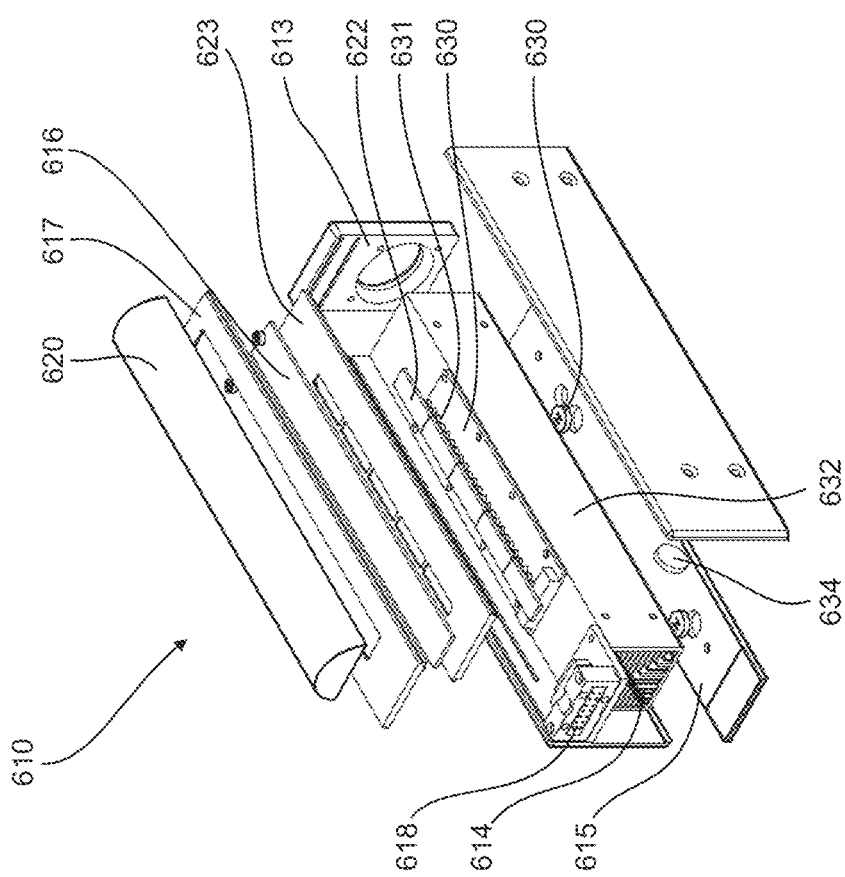
FIG. 7 is an exploded view of the LED light module.

According to some embodiments, the homogeneous illumination of the base of the microtiter plate 60 can be achieved by a pair of LED light modules 610 with 12 to 36 (UV or VIS) high-output LED light sources 631 which can be arranged in rows and oriented diagonally in relation to the plate (FIGS. 11, 12 and 7). The LEDs 631 used supply excitation light 92 within the wavelength range from 340 to 800 nm and extinction filters improve the wavelength selectivity by transmitting a selected wavelength range. The emitted fluorescence light 94 is detected at an angle of 90° by a rapid and highly sensitive back-illuminated EMCCD (electron multiplying charge coupled device) or ICCD (intensified charge coupled device) camera 82. The camera 82 is equipped with interference filters 84 and can additionally be equipped with polarization filters 85.

Fluorescence detection with 2 cameras 82 and a beam splitter mirror 90 allows the simultaneous detection of two emission signals, as necessary, for example, in measurements in relation to Förster resonance energy transfer (FRET), bioluminescence resonance energy transfer (BRET) or in relation to fluorescence polarization (FP).

According to an embodiment, it is possible to expand the measurement system shown in FIGS. 11 and 12 by further LED illumination units, which are arranged beneath the LED units shown at an altered illumination angle. If these additional LED units have a different wavelength compared to the original LED units, it is possible to effect a fluorescence excitation in multiple wavelengths.

Figure 13:
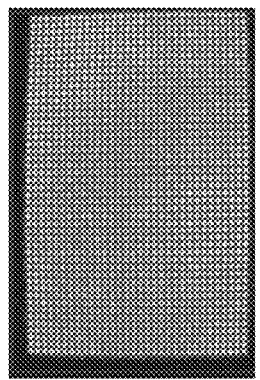
FIG. 13 shows the emission profile of a microtiter plate with 1536 assay wells.

The false-color depiction of the emission of a microtiter plate with 1536 assay wells containing fluorescent solution is depicted by way of example in FIG. 13. Data for the assay wells are collected by capturing and visualizing up to 1000 points per second per assay well and processing them by means of customized data processing software.

Performance Test

A method routinely used to test the performance of a rapid mixing device is the observance of a rapid test reaction. In the case of fluorescence studies, what is suitably tracked is the binding of the hydrophobic dye 1-anilino-8-naphthalenesulfonic acid (ANS) to bovine serum albumin (BSA), which is associated with a large increase in fluorescence yield. The fluorescence kinetics for various BSA concentrations are fitted to exponential functions and extrapolated to a common starting fluorescence. This common point provides the fluorescence of ANS in the absence of BSA at the starting time point ($t_0$) of the reaction. The time interval from this point up to the first data point which falls onto the fitted exponential curve provides an estimate of the dead time of the measurement. FIGS. 14 A-C show the corrected fluorescence kinetics at various BSA concentrations, which were measured in the imaging measurement instrument with the inventive dispensing device for rapid kinetics.

Figure 14A:
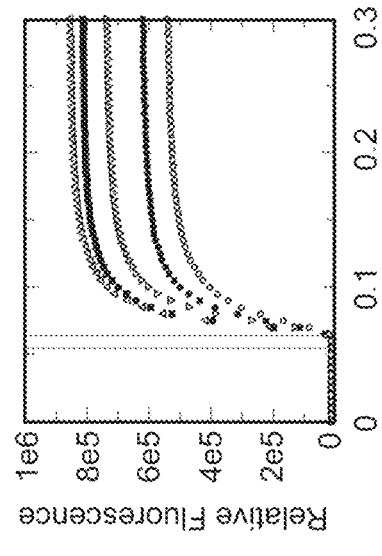
FIG. 14 A-C show the measurement of the kinetics of the binding of ANS to BSA using the imaging measurement instrument.

After 55 ms, 1.6 μl of ANS solution were added via capillary valve switching of 9 ms to a BSA-containing microtiter plate with 1536 assay wells (FIG. 14A). The capillary valve switching is indicated by the gray bar. The binding of ANS to BSA leads to an increase in ANS fluorescence, which is recorded at 460 nm (bandpass 60 nm) after excitation at 365 nm (bandpass 36 nm). The ANS and BSA solutions were prepared in 100 mM potassium phosphate (pH 7.5). Final concentration: 5 μM ANS and 1.9 (open circles), 2.5 (filled circles), 3.4 (inverted triangles), 7.9 (squares) and 10.6 μM (triangles) BSA (FIG. 14A).

The starting time point of the binding reaction was ascertained by double exponential fits and extrapolation of the fluorescence kinetics to the common start time $t_0$. The fluorescence kinetics (gathered from FIG. 14 A) were corrected to said start time to (FIG. 14 B). Solid lines show double exponential functions which were extrapolated to the common time point to.

It should be noted that to of the reaction is not equivalent to the time point of valve switching, but instead has a time delay corresponding to the entry and the mixing of the reactants in the assay wells. The dead time of the instrument, which is implemented by the period from to up to the first correctly determined point on the fitted exponential curve, is based on the dispensing time and mixing artifacts. In the case of the presence of 3 μl of liquid in the assay wells of a microtiter plate and dispensing of a small volume of 1.6 μl into the 1536 assay wells of said microtiter plates, it is possible to achieve a dead time of about 10 ms, which approximately corresponds to the time-resolution of commercial stopped-flow instruments of a few milliseconds.

Figure 14C:
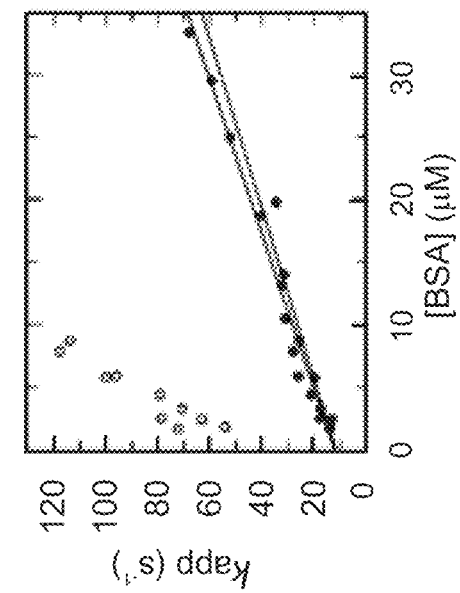
Figure 14B:
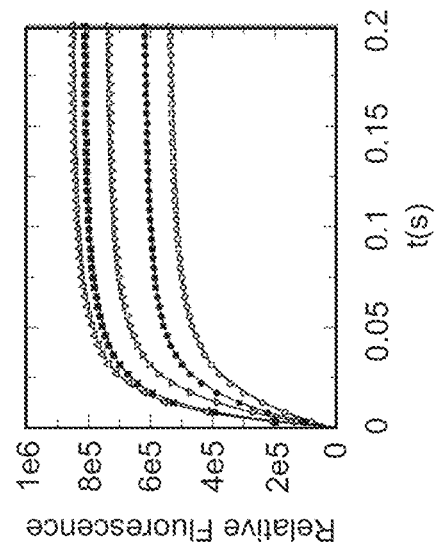

The detected fluorescence traces (FIG. 14B) show a very low noise level, which according to an embodiment indicates the high quality of the kinetics data. FIG. 14C shows a graph of the apparent rate constants of binding, ascertained from the kinetics traces, as a function of the BSA concentration. It was possible to detect a slow (filled circles) binding phase and a rapid binding phase (open circles). The linear dependency of the binding phase with slow kinetics on the BSA concentration can confirm the accuracy and reliability of the determined traces. The observed rate constants (black) were compared with data which were obtained by means of a conventional stopped-flow apparatus (red).

According to an embodiment, the apparent rate constants and the second-order rate constants, which were determined on the basis of the concentration-dependence of the slow binding phase, coincide outstandingly with the data which were obtained via addition in a stopped-flow apparatus in an individual cuvette.

REFERENCE NUMBERS

Figure 8:
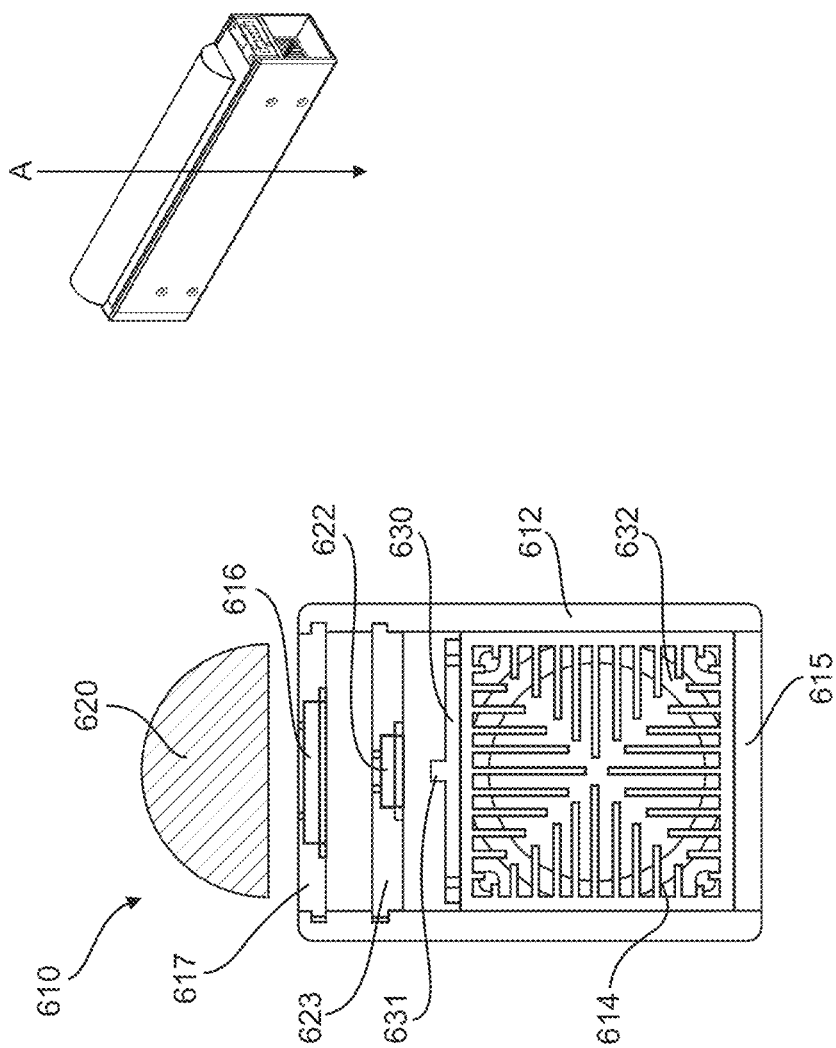
FIG. 8 is a cross-sectional view of the LED light module.
Figure 9:
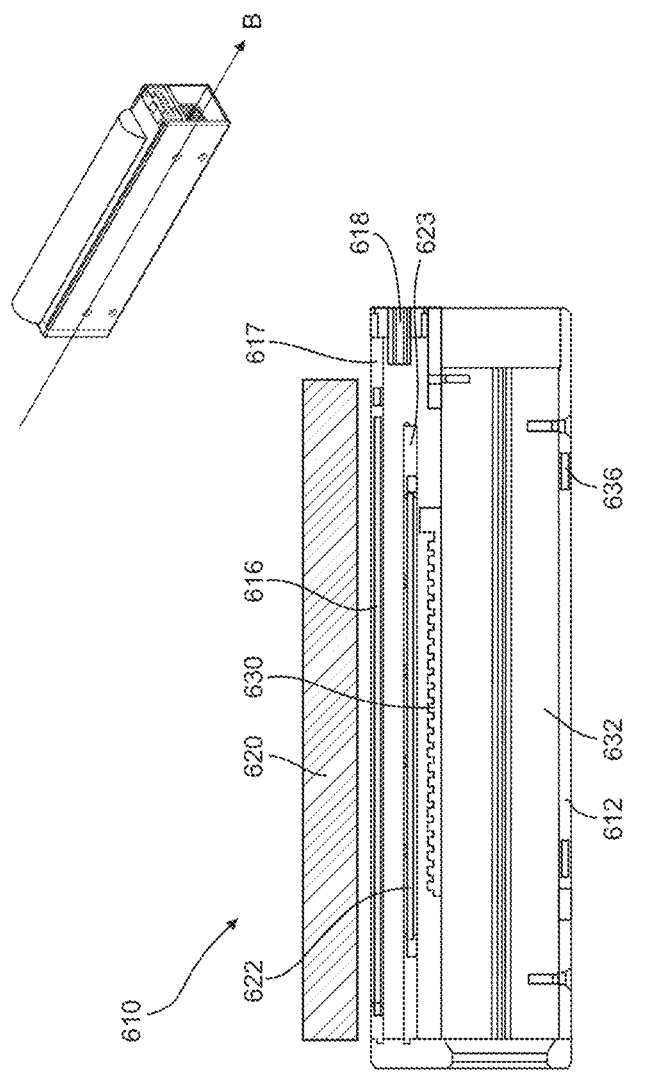
FIG. 9 is a longitudinal-sectional view of the LED light module.

10 Dispensing device
1 Valve
2 Housing
3 Leakage/vent opening
4 Tube
5 Pressure chamber
6 Supply opening
7 Mount
8 Sheath
60 Microtiter plate
62 Plate holder
64 Reservoir vessel
65 Liquid
66 Pump
68 Pressure line
70 Line
71 Line
72 Valve
82 Camera
84 Emission filter
85 Polarization filter
90 Beam splitter
92 Excitation light
94 Fluorescence light
610 LED light module
612 Housing
613 Front housing cover with cooling-air inflow opening
614 Fan position for suction of cooling air
615 Housing base
616 Protective glass or polarization filter
617 Protective-glass mount
618 Electrical connection
620 Cylindrical lens
622 Excitation filter
623 Filter mount
630 LED board
631 LED
632 Heat sink
634 RFID transponder
636 Holding magnet
660 Trigger signal
662 Voltage profile of the LED emission in FIG. 10b)
664 Voltage profile of the LED emission in FIG. 10d)
666 Time axis in FIG. 10
A Sectional axis for FIG. 8
B Sectional axis for FIG. 9

The invention claimed is:

1. A method for measurement in high-throughput screening with high time-resolution, comprising:
providing:
a microtiter plate comprising a transparent base and multiple assay wells,
a dispensing system arranged above the microtiter plate for the simultaneous addition of liquid into the multiple assay wells, wherein the dispensing system comprises a pressure chamber having
a supply opening for supplying pressurized liquid into the pressure chamber; and
multiple conduits in each of which a tube is arranged for dispensing pressurized liquid from the interior of the pressure chamber into one of the multiple wells;
an illumination system beneath the microtiter plate that is configured for illuminating the multiple assay wells simultaneously through the transparent base,
a detection system that is configured for detecting electromagnetic radiation from the multiple assay wells simultaneously through the transparent base;
adding 0.3-300 µl of liquid per assay well from the dispensing system into the multiple assay wells;
illuminating the multiple assay wells simultaneously through the transparent base using the illumination system, wherein illumination occurs before a start of the addition of liquid or occurs from a time point of the start of the addition; and
detecting the electromagnetic radiation from the multiple assay wells simultaneously at a time interval of 1-1000 ms between individual measurement points.

2. The method of claim 1, wherein the microtiter plate has 384 or 1536 assay wells.

3. The method of claim 1, wherein the dispensing system is suitable for simultaneously adding liquid into 24 or 48 assay wells.

4. The method of claim 1, wherein the addition of liquid by the dispensing system is done at a pressure within the range from 0.5-2 bar.

5. The method of claim 4, wherein the pressure ranges from 0.5 to 0.85 bar.

6. The method of claim 4, wherein the pressure is 0.8 bar.

7. The method of claim 1, wherein the addition of 0.3-300 µl of liquid per assay well from the dispensing system is done into the multiple assay wells simultaneously within 5-200 ms at a pressure within the range from 0.5 bar to 2 bar.

8. The method of claim 1, wherein the addition of the liquid by the dispensing system is done diagonally or in parallel to side walls of the assay wells of the microtiter plate.

9. The method of claim 1, wherein the illumination is done by a pair of LED light modules with, in each case, 12 to 36 LED light sources, the LED light modules being arranged beneath the microtiter plate on opposite sides and illuminating the base of the microtiter plate at an angle within the range from 20 to 80 degrees.

10. The method of claim 9, wherein the LED light sources emit light within the wavelength range from 340 to 800 nanometers.

11. The method of claim 10, wherein the detection of the emitted light is done at a right angle to the base of the microtiter plate and the detection system is positioned centrally under the microtiter plate.

12. The method of claim 10, wherein the detection of the emitted light is done simultaneously at various wavelengths.

13. The method of claim 10, wherein the LED light sources comprise extinction filters.

14. The of claim 1, wherein the illumination is done by multiple LED light modules with differing wavelength for the activation of light-sensitive proteins and/or excitation of a fluorescence measurement.

15. The system of claim 1, wherein the dispensing system further comprises a valve for controlling the pressure of the pressurized liquid supplied to the pressure chamber.

16. A system for rapid kinetic measurements in high-throughput screening with high time-resolution, comprising:
a microtiter plate comprising a transparent base and multiple assay wells, a dispensing system arranged above the microtiter plate for the simultaneous addition of liquid into the multiple assay wells;

an illumination system beneath the microtiter plate that is configured for illuminating the multiple assay wells simultaneously through the transparent base; and a detection system that is configured for detecting electromagnetic radiation from the multiple or all the assay wells simultaneously through the transparent base, wherein the dispensing system comprises a pressure chamber having a supply opening for supplying pressurized liquid into the pressure chamber, multiple conduits in each of which a tube is arranged for dispensing pressurized liquid from the interior of the pressure chamber into one of the multiple wells.

17. The system of claim 16, wherein the dispensing system is configured for the addition of 0.3-300 µl of the pressurized liquid per assay well into the multiple assay wells simultaneously within 5-200 ms at a pressure within the range from 0.5 bar to 2 bar.

18. The system of claim 17, wherein the dispensing system comprises a control system for the addition of 0.3-300 µl of liquid per assay well from the dispensing system to be done into the multiple assay wells simultaneously within 5-200 ms at a pressure within the range from 0.5 bar to 2 bar.

19. The system of claim 16, wherein the detection system is configured for the detection of the electromagnetic radiation from the multiple or all the assay wells simultaneously at a time interval of 1-1000 ms between individual measurement points.

20. The system of claim 16, wherein the microtiter plate has 384 or 1536 assay wells.

21. The system of claim 16, wherein the dispensing system is configured for simultaneously adding liquid into 24 or 48 or 2×24 or 2×48 assay wells.

22. The system of claim 16, wherein the dispensing system comprises a control system that is configured for allowing the addition of liquid by the dispensing system to be done at a pressure within the range from 0.5-2 bar.

23. The system of claim 22, wherein the pressure ranges from 0.5 to 0.85 bar.

24. The system of claim 22, wherein the pressure is 0.8 bar.

25. The system of claim 16, wherein the illumination system comprises a pair of LED light modules with, in each case, 12 to 36 (UV and/or VIS) high-output LED light sources that are arranged beneath the microtiter plate on opposite sides and illuminate the base of the microtiter plate at an angle ranging from 20 to 80 degrees.

26. The system of claim 25, wherein the high-output LED light sources emit light within the wavelength range from 340-800 nanometers.

27. The system of claim 26, wherein the detection of the emitted light is done at a right angle to the base of the microtiter plate and the detection system is positioned centrally under the microtiter plate.

28. The system of claim 26, wherein the detection of the emitted light is done simultaneously at various wavelengths.

29. The system of claim 26, wherein the high-output LED light sources comprise extinction filters.

30. The system of claim 16, wherein the illumination system comprises multiple LED light modules with differing wavelength.

31. The system of claim 16, wherein the dispensing system further comprises a valve for controlling the pressure of the pressurized liquid supplied to the pressure chamber.

* * * * *